(12) United States Patent
Lee et al.

(10) Patent No.: US 8,557,202 B1
(45) Date of Patent: Oct. 15, 2013

(54) SEPARATION METHOD OF ZIRCONIUM AND HAFNIUM WITH ACIDIC EXTRACTANTS

(71) Applicant: Korea Institute of Science and Technology, Seoul (KR)

(72) Inventors: Hwa Young Lee, Seoul (KR); Byung Won Cho, Seoul (KR); Joong Kee Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/667,404

(22) Filed: Nov. 2, 2012

(30) Foreign Application Priority Data

Aug. 9, 2012 (KR) ........................ 10-2012-0087448

(51) Int. Cl.
*C22B 34/00* (2006.01)
(52) U.S. Cl.
USPC ............................................................ 423/70
(58) Field of Classification Search
USPC ............................................................ 423/70
See application file for complete search history.

(56) References Cited

U.S. PATENT DOCUMENTS

| | | | |
|---|---|---|---|
| 4,873,072 | A | 10/1989 | Abodishish |
| 5,176,878 | A | 1/1993 | Sarbeck et al. |
| 2003/0143138 | A1 | 7/2003 | Sommers et al. |

FOREIGN PATENT DOCUMENTS

CN 101759230 A * 6/2010

OTHER PUBLICATIONS

M. Taghizadeh, et al; "Separation of zirconium and hafnium by solvent extraction using mixture of TBP and Cyanex 923", Journal of Nuclear Materials, vol. 412, Available online Mar. 30, 2011, pp. 334-337.
M. Taghizadeh, et al; "Determination of optimum process conditions for the extraction and separation of zirconium and hafnium by solvent extraction", Hydrometallurgy, vol. 90, Available online Oct. 13, 2007, pp. 115-120.
I.S. El-Yamani, et al; "Studies on Extraction of Zirconium(IV) by Tricapryl Methyl Ammonium Chloride from Sulphate Media and its Separation from Hafnium(IV)", Journal of Radioanalytical Chemistry, vol. 45, No. 1, pp. 125-133; Received Dec. 22, 1977.

* cited by examiner

*Primary Examiner* — Steven Bos
(74) *Attorney, Agent, or Firm* — Ladas & Parry LLP

(57) ABSTRACT

A separation method of zirconium and hafnium according to an example of the present invention comprising, mixing step to prepare a crude liquid for extraction, by mixing a sulfuric acid solution including zirconium and hafnium, a catalyst, and an acidic extractant; and first extraction step to form a first extract solution layer comprising the acidic extractant in which the hafnium has been extracted and a sulfuric acid solution layer separated from the first extract solution layer, wherein the acidic extractant comprises any one selected from a group consisting of D2EHPA (Di-(2-ethylhexyl)phosphoric acid), PC88A (2-Ethylhexyl phosphonic acid mono-2-ethylhexyl ester), and a combination thereof. The separation method not only saves the amount of extractant used but also increases separation effect of zirconium and hafnium known to be difficult for separating each other, without using no toxic compound such as cyan.

8 Claims, No Drawings

SEPARATION METHOD OF ZIRCONIUM AND HAFNIUM WITH ACIDIC EXTRACTANTS

CROSS-REFERENCE TO RELATED APPLICATION

The present disclosure relates to subject matter contained in priority Korean Application No. 10-2012-0087448, filed on Aug. 9, 2012, which is herein expressly incorporated by reference in its entirety.

BACKGROUND OF THE INVENTION

1. Field of the Invention

The present disclosure relates to a separation method of zirconium and hafnium with acidic extractants, and particularly, relates to a separation method of zirconium and hafnium with using reduced amount of extractant and dramatically increasing separation effect of zirconium and hafnium which are difficult to separate.

2. Background of the Invention

Zirconium is an essential material used for fuel rod in nuclear power generation, which is not produced in Korea at present, so the whole quantity of required zirconium is imported from foreign countries. As is generally known, the metal zirconium used for the fuel rod of nuclear reactor must not exceed 50 ppm of hafnium content, thus it is required to develop a technology to separate zirconium and hafnium.

Generally, the zirconium ore distributed in the earth's crust contains 0.5 to 2% of hafnium and zirconium and hafnium have very similar physiochemical properties each other, so it is very difficult to separate them. Separation methods of zirconium and hafnium known until now, include fractional crystallization of fluoride complex, distillation using volatility difference of chloride, and solvent extraction. Because these separation methods have their own merits and demerits, it is required to select appropriate separation methods by considering economical efficiency and operation condition.

The solvent extraction method is the longest standing method used for separating zirconium and hafnium, which uses extractant to separate the above two metals existing in solution. As the above extractant, a lot of extractant such as diethyl ether, methyl isobutyl ketone (MIBK), tributyl phosphate (TBP), trioctyl amine (TOA), trioctyl methylammonium chloride have been used alone or in combination. Among the above extractant, however, only a few extractant were actually commercialized for separation of zirconium and hafnium. The reason is that effective extractant for the separation are rare and there is economical problem such as price of extractant.

As to the solvent extraction processes of zirconium/hafnium that have been commercialized until now, there are a process using MIBK (methyl isobutyl ketone) and a process using TBP (Tri-Butyl Phosphate) as an extractant.

The process using MIBK as an extractant has a merit to use smaller amount of extractant since amount of hafnium is much less than that of zirconium in solution. In the above method, however, it is required to add thiocyanate ions ($SCN^{-1}$) to the solution prior to the extraction, so there are some demerits that environmental pollution may be caused by CN-compounds and the price of MIBK is expensive. In addition, because solubility of MIBK in water is very high as about 1.8%, there is another demerit that loss of extractant is large.

Besides, the process using TBP as an extractant has a merit that it is not needed to add CN-compounds different from the above MIBK process, but it extracts zirconium selectively rather than hafnium, so has a problem to use relatively too large amount of extractant.

Therefore, it is required to develop a technology for an extractant and an extraction condition to overcome the above mentioned problems and satisfy both economic efficiency and separation effect of zirconium and hafnium, but any innovative solvent extraction method that can substitute for the traditional method is not developed yet.

BACKGROUND OF THE INVENTION

An object of the present invention is to provide a separation method of zirconium and hafnium, which is more eco-friendly than the traditional solvent extraction methods thereof because no toxic chemical such as cyan is used, is economically advantageous because it is possible to extract hafnium contained in much less amount than zirconium selectively, so as to save great amount of extractant required for extraction and separation of metal. Since this method can reduce the content of hafnium in zirconium to below 50 ppm, maintaining over 95% of recovery rate of the zirconium, it is possible to increase separation effect of two metals dramatically in comparison with the traditional methods.

In order to achieve the above object, a separation method of zirconium and hafnium according to an example of the present invention comprises mixing step to prepare a crude liquid for extraction by mixing a sulfuric acid solution containing zirconium and hafnium, a catalyst, and an acidic extractants; and first extraction step to form a first extract solution layer comprising the acidic extractant in which the hafnium has been extracted and a sulfuric acid solution layer separated from the first extract solution layer.

The acidic extractant may include any one selected from the group consisting of D2EHPA (Di-(2-ethylhexyl)phosphoric acid), PC88A (2-Ethylhexyl phosphonic acid mono-2-ethylhexyl ester), and a combination thereof.

The catalyst may include iodine.

The content of sulfuric acid in the sulfuric acid solution may be 2 to 10 mol/L.

The content of the catalyst may be 0.01 to 0.1 g/L on the basis of the sulfuric acid solution.

The acidic extractant may include diluent which may be organic solvent, and the first extract solution layer in the first extraction step may include the diluent.

The separation method of zirconium and hafnium may further comprise separation step and reverse extraction step after the first extraction step.

The separation step may be a process to separate the first extract solution layer and the sulfuric acid solution layer. The reverse extraction step may be a process to prepare a second extract solution by mixing and stirring the first extract solution and water for extracting zirconium from the first extract solution layer to water.

The iodine is derived from any one selected from a group consisting of potassium iodide (KI), sodium iodide, (NaI), ammonium iodide ($NH_4I$), and combinations thereof.

DETAILED DESCRIPTION OF THE INVENTION

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

A separation method of zirconium and hafnium according to an example of the present invention comprises mixing step and first extraction step. In addition, the separation method of zirconium and hafnium may comprise separation step and reverse extraction step after the first extraction step.

The mixing step comprises a process to prepare a crude liquid for extraction by mixing a sulfuric acid solution containing zirconium and hafnium, a catalyst, and an acidic extractant.

Generally, the zirconium ore distributed in the earth's crust contains 0.5 to 2 wt % of hafnium and zirconium and hafnium have very similar physiochemical properties, so it is very difficult to separate them. In the present invention, a solvent extraction process applies to separate zirconium and hafnium effectively by using a sulfuric acid solution when the zirconium and hafnium coexist.

The sulfuric acid solution may be a solution prepared by dissolving zirconium compound containing a certain amount of hafnium in water and mixing them with sulfuric acid. The sulfuric acid solution should be an aqueous solution in which sulfuric acid, zirconium and hafnium coexist, and it is further proper to use sulfuric acid than to use hydrochloric acid or nitric acid for the separation method.

The concentration of sulfuric acid in the sulfuric acid solution may be 2 to 10 mol/L. When the sulfuric acid concentration exceeds the above concentration range, the separation effect of zirconium and hafnium may be reduced.

The catalyst applies to promote selective extraction of hafnium contained in the sulfuric acid solution by acidic extractant. The catalyst may be iodine, which may be included as a form of iodide ion ($1^{-1}$) in the sulfuric acid solution or the crude liquid for extraction. When applying iodine as the catalyst, it is possible to promote separation effect of zirconium and hafnium.

Something able to provide iodide ions to the sulfuric acid solution or the crude liquid for extraction is sufficient to apply for the above catalyst, and it is not limited in specific compounds. However preferably, the iodine may be derived from any one selected from the group consisting of potassium iodide (KI), sodium iodide (NaI), and ammonium iodide ($NH_4I$), and combinations thereof.

The concentration of the catalyst may be 0.01 to 0.1 g/L on the basis of the sulfuric acid solution. When the concentration of the catalyst is below 0.01 g/L, the separation effect of zirconium and hafnium may decrease, and when the concentration thereof exceeds 0.1 g/L, the amount of chemical agent used may increase unnecessarily.

The acidic extractant may comprise any one selected from a group consisting of D2EHPA (Di-(2-ethylhexyl)phosphoric acid), PC88A (2-Ethylhexyl phosphonic acid mono-2-ethylhexyl ester), and a combination thereof.

When excluding D2EHPA or PC88A as the above acidic extractant, the separation effect of zirconium and hafnium may decrease remarkably or it may be difficult to extract only hafnium selectively.

The acidic extractant may further comprise diluent. The diluent may be organic solvent, concretely, be at least one organic solvent selected from the group consisting of kerosene, hexane, benzene, toluene, and combinations thereof. However, the diluent are not limited in the above organic solvent and something that does not inhibit the separation of zirconium and hafnium in the present invention with acting as a diluent of the acidic extractant may be applied.

The diluent may be further comprised in the first extract solution layer in the first extraction step and then, may be separated from the sulfuric acid solution layer in the separation step.

The first extraction step comprises a process to stir the crude liquid for extraction and to form the first extract solution layer comprising the acidic extractant in which the hafnium has been extracted separately from the sulfuric acid solution of the crude liquid for extraction and the sulfuric acid solution layer separated from the first extract solution layer.

In the first extraction step, the hafnium is solvent extracted selectively from the crude liquid for extraction to the first extract solution layer by stirring and this extraction may be promoted by vigorous stirring.

By the stirring, only the extremely small amount of zirconium may be extracted to the acidic extractant and almost amount of zirconium may be remained in the sulfuric acid solution. However, almost the whole quantity of hafnium is extracted to the acidic extractant from the crude liquid for extraction, and thus, it is possible to separate zirconium and hafnium very effectively.

The stirring may be performed at room temperature or at high temperature by raising the temperature.

The separation step comprises a process to separate the first extract solution layer and the sulfuric acid solution layer and the reverse extraction step comprises a process to prepare the second extract solution by mixing and stirring the first extract solution and water for extracting zirconium and hafnium from the first extract solution layer to water.

The first extract solution layer and the sulfuric acid solution layer passing through the first extraction step may be separated via conventional phase separation process. The first extract solution layer to which the hafnium has been extracted selectively and the sulfuric acid solution layer where the zirconium has been remained are prepared.

From the first extract layer, hafnium and small amount of zirconium included in the first extract solution layer can be recovered via reverse extraction by mixing it with water and stirring them. The reverse extraction methods using water is advantageous in some points that the reverse extraction can be accomplished eco-friendly and with low cost, but it is not limited in this and any method available to reverse extraction may be applied.

The separation method of zirconium and hafnium according to the present invention relates to the separation method of zirconium and hafnium applying acidic extractant, which can not only save the amount of extractants used but also increase the separation effect of zirconium and hafnium dramatically, which are known to be difficult for separating each other.

The separation method of zirconium and hafnium according to the present invention is more eco-friendly than the traditional solvent extraction method to separate zirconium and hafnium. The separation method of zirconium and hafnium is economically advantageous, because no toxic chemical such as cyanide is used and it is possible to extract hafnium which is contained in much less amount than zirconium relatively, so as to save great amount of extractant required for extraction and separation of metal. It is also possible to increase separation effect of these two metals dramatically in comparison with the traditional methods because this separation method can reduce the content of hafnium in zirconium to below 50 ppm, maintaining over 95% of the zirconium recovery rate.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

Example 1

1 L of sulfuric acid solution containing 17,500 mg/L of zirconium and 148.5 mg/L of hafnium (sulfuric acid concentration 2 mol/L) was prepared and added potassium iodide (KI) to result in 0.1 g/L of iodine content. It was mixed with 1 L of D2EHPA (Di-(2-ethylhexyl)phosphoric acid), an acidic extractant, in a reactor and a crude liquid for extraction was prepared (mixing step).

Stirring the crude liquid for extraction vigorously for 1 hr, a first extract solution layer in which hafnium had been extracted selectively to the acidic extractant (D2EHPA) from the sulfuric acid solution of the crude liquid for extraction was prepared. A sulfuric acid solution layer formed separately from the first extract solution during the above procedure (The first extraction step).

After the stirring was discontinued and phase separation of the sulfuric acid solution layer and the first extract solution layer was performed, these two layers were separated (separation step).

By mixing the first extract solution layer and water as 1:1 in volume ratio, reverse extraction of zirconium and hafnium contained in the first extract solution layer to water was accomplished and a second extract solution was prepared (reverse extraction step).

In the second extract solution, the whole quantity of zirconium and hafnium that had been contained in the first extract solution layer was reverse extracted. As results of analysis using IPC spectrophotometer (manufacturer: Perkin Elmer, Model: Optima 5300 DV), it was found that the content of zirconium contained in the second extract solution was 510 mg/L, and the content of hafnium was 147.8 mg/L.

It was shown that the recovery rate of zirconium which was separated and recovered by the separation method of zirconium and hafnium according to Example 1 was remarkably excellent as 97.1% $\{=(17,500-510)/17,500\}$. In addition, it was suggested that because the content of hafnium that had been mixed with the zirconium was reduced remarkably from the initial content, 8,414 ppm $\{=148.5/(17,500+148.5)\}$ to 41.2 ppm $\{=(148.5-147.8)/\{(17,500-510)+(148.5-147.8)\}\}$, separation of zirconium and hafnium was accomplished effectively. Particularly, it was identified that the content of hafnium included in the zirconium separated by Example 1 could be reduced to below 50 ppm.

Example 2

Sodium iodide (NaI) was added to 1 L of sulfuric acid solution containing 17,500 mg/L of zirconium and 148.5 mg/L of hafnium (sulfuric acid concentration 10 mol/L) to result in 0.01 g/L of iodine content. It was mixed with 1 L of PC88A (2-Ethylhexyl phosphonic acid mono-2-ethylhexyl ester), an acidic extractant, in a reactor and a crude liquid for extraction was prepared according to same method as Example 1 (mixing step).

Stirring the crude liquid for extraction vigorously for 1 hr, a first extract solution layer in which hafnium had been extracted to the acidic extractant (PC88A) from the sulfuric acid solution of the crude liquid for extraction was prepared. A sulfuric acid solution layer formed separately from the first extract solution during the above procedure (The first extraction step).

After the stirring was discontinued and phase separation of the sulfuric acid solution layer and the first extract solution layer was performed, a separation of these two layers was done (separation step).

By mixing the first extract solution layer and water as 1:1 in volume ratio, reverse extraction of zirconium and hafnium contained in the above first extract solution layer to water was accomplished and a second extract solution was prepared (reverse extraction step).

In the second extract solution, the whole quantity of zirconium and hafnium that had been contained in the first extract solution layer was reverse extracted. As results of analysis using IPC spectrophotometer (manufacturer: Perkin Elmer, Model: Optima 5300 DV), it was found that the content of zirconium contained in the second extract solution was 535 mg/L, and the content of hafnium was 148.0 mg/L.

It was shown that the recovery rate of zirconium which was separated and recovered by the separation method of zirconium and hafnium according to Example 2 was remarkably excellent as 96.9% $\{=(17,500-535)/17,500\}$. In addition, it was suggested that because the content of hafnium that had been mixed with the zirconium was reduced remarkably from the initial content, 8,414 ppm $\{=148.51/(17,500+148.5)\}$ to 29.5 ppm $\{=(148.5-148.0)/\{(17,500-535)+(148.5-148.0)\}\}$, separation of zirconium and hafnium was accomplished effectively. Particularly, it was identified that the content of hafnium included in the zirconium separated by Example 2 could be reduced to below 50 ppm.

Example 3

Potassium iodide (KI) was added to 1 L of sulfuric acid solution containing 17,500 mg/L of zirconium and 148.5 mg/L of hafnium (sulfuric acid concentration 2 mol/L) to result in 0.01 g/L of iodine content. It was mixed with 0.25 L of D2EHPA, 0.25 L of PC88A as an acidic extractant, and 0.5 L of kerosene as a diluent in a reactor to prepare a crude liquid for extraction according to same method as Example 1 (mixing step).

Stirring the crude liquid for extraction vigorously for 1 hr, a first extract solution layer in which hafnium had been selectively extracted to the acidic extractant including the diluent from the sulfuric acid solution of the crude liquid for extraction was prepared. A sulfuric acid solution layer formed separately from the first extract solution during the above procedure (The first extraction step).

After stirring was discontinued and phase separation of the sulfuric acid solution layer and the first extract solution layer was performed, a separation of these two layers was done (separation step).

By mixing the first extract solution layer and water as 1:1 in volume ratio, reverse extraction of zirconium and hafnium contained in the first extract solution layer to water was accomplished and a second extract solution was prepared (reverse extraction step).

In the second extract solution, the whole quantity of zirconium and hafnium that had been contained in the first extract solution layer was reverse extracted. As results of analysis using IPC spectrophotometer (manufacturer: Perkin Elmer, Model: Optima 5300 DV), it was found that the content of zirconium contained in the second extract solution was 437 mg/L, and the content of hafnium was 147.7 mg/L.

It was shown that the recovery rate of zirconium which was separated and recovered by the separation method of zirconium and hafnium according to Example 3 was remarkably excellent as 97.5% {=(17,500−437)117,500}. In addition, it was suggested that because the content of hafnium that had been mixed with the zirconium was reduced remarkably from the initial content, 8,414 ppm {=148.5/(17,500+148.5)} to 46.9 ppm {=(148.5−147.7)/{(17,500−437)+(148.5−147.7)}}, separation of zirconium and hafnium was accomplished effectively. Particularly, it was identified that the content of hafnium included in the zirconium separated by Example 3 could be reduced to below 50 ppm.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A separation method of zirconium and hafnium comprising the steps of:
    a mixing step to prepare a crude liquid for extraction, by mixing a sulfuric acid solution including zirconium and hafnium, a catalyst, and an acidic extractant; and
    a first extraction step of forming a first extract solution layer comprising the acidic extractant in which the hafnium has been extracted and a sulfuric acid solution layer separated from the first extract solution layer,
    wherein the acidic extractant comprises one selected from the group consisting of di-(2-ethylhexyl) phosphoric acid, 2-ethylhexyl phosphonic acid mono-2-ethylhexyl ester and a combination thereof.

2. The separation method of zirconium and hafnium according to claim 1, wherein the catalyst includes iodine.

3. The separation method of zirconium and hafnium according to claim 1, wherein sulfuric acid content of the sulfuric acid solution is 2 to 10 mol/L.

4. The separation method of zirconium and hafnium according to claim 1, wherein catalyst content of the crude liquid for extraction is 0.01 to 0.1 g/L.

5. The separation method of zirconium and hafnium according to claim 1, wherein the acidic extractant further comprises a diluent which is an organic solvent and the first extract solution layer of the first extraction step comprises the diluent.

6. The separation method of zirconium and hafnium according to claim 1, further comprising a separation step and a reverse extraction step after the first extraction step,
    wherein the separation step is to separate the first extract solution layer and the sulfuric acid solution layer, and the reverse extraction step is to prepare a second extract solution by mixing and stirring the first extract solution and water for extracting zirconium from the first extract solution layer to water.

7. The separation method of zirconium and hafnium according to claim 2, wherein the iodine is one selected from the group consisting of potassium iodide, sodium iodide, ammonium iodide and their combinations.

8. A method of obtaining zirconium from a mixture of zirconium and hafnium comprising the steps of:
    a mixing step to prepare a crude liquid for extraction, by mixing a sulfuric acid solution including zirconium and hafnium, a catalyst, and an acidic extractant; and
    a first extraction step of forming a first extract solution layer comprising the acidic extractant in which the hafnium has been extracted and a sulfuric acid solution layer separated from the first extract solution layer,
    a separation step and
    a reverse extraction step after the first extraction step to obtain zirconium having content of below 50 ppm of hafnium;
wherein,
    the acidic extractant is selected from the group consisting of di-(2-ethylhexyl) phosphoric acid, 2-ethylhexyl phosphonic acid mono-2-ethylhexyl ester and a combination thereof; and
    the separation step is to separate the first extract solution layer and the sulfuric acid solution layer, and the reverse extraction step is to prepare a second extract solution by mixing and stirring the first extract solution and water for extracting zirconium from the first extract solution layer to water.

* * * * *